(12) United States Patent
Han et al.

(10) Patent No.: US 8,850,247 B2
(45) Date of Patent: *Sep. 30, 2014

(54) POWER MANAGEMENT FOR A SYSTEM ON A CHIP (SOC)

(71) Applicant: Intel Corporation, Santa Clara, CA (US)

(72) Inventors: Woojong Han, Phoenix, AZ (US); Madhu Athreya, Saratoga, CA (US); Ken Shoemaker, Los Altos Hills, CA (US); Arvind Mandhani, San Francisco, CA (US); Mahesh Wagh, Portland, OR (US); Ticky Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,999

(22) Filed: Jun. 25, 2013

(65) Prior Publication Data

US 2013/0290756 A1 Oct. 31, 2013

Related U.S. Application Data

(63) Continuation of application No. 13/611,930, filed on Sep. 12, 2012, now Pat. No. 8,510,580, which is a continuation of application No. 12/079,185, filed on Mar. 25, 2008, now Pat. No. 8,286,014.

(51) Int. Cl.
*G06F 1/32* (2006.01)

(52) U.S. Cl.
CPC ............ *G06F 1/3234* (2013.01); *G06F 1/3243* (2013.01); *G06F 1/3203* (2013.01); *Y02B 60/1239* (2013.01)
USPC ............ 713/320; 713/300; 713/324; 713/600

(58) Field of Classification Search
USPC .................. 713/300, 320, 322, 324, 600, 601
See application file for complete search history.

(56) References Cited

U.S. PATENT DOCUMENTS

| | | | |
|---|---|---|---|
| 6,009,488 A | 12/1999 | Kavipurapu |
| 6,694,380 B1 | 2/2004 | Wolrich et al. |
| 6,810,460 B1 | 10/2004 | Kirkwood |
| 6,816,938 B2 | 11/2004 | Edara et al. |
| 6,848,057 B2 | 1/2005 | Hicok |
| 6,986,074 B2 | 1/2006 | Alia et al. |

(Continued)

OTHER PUBLICATIONS

U.S. Patent and Trademark Office, Office Action dated Nov. 13, 2009 with Reply to Office Action filed Feb. 11, 2010 in U.S. Appl. No. 12/080,076.

(Continued)

*Primary Examiner* — Paul Yanchus, III
(74) *Attorney, Agent, or Firm* — Trop, Pruner & Hu, P.C.

(57) ABSTRACT

In one embodiment, the present invention includes a method for sending a first link handshake signal between a first subsystem and a power management unit (PMU) of a system on a chip (SoC) to request entry into a power saving state for the first subsystem, sending a second link handshake signal between the first subsystem and the PMU to acknowledge the request, and placing the first subsystem into the power saving state without further signaling between the PMU and the first subsystem. Other embodiments are described and claimed.

20 Claims, 5 Drawing Sheets

(56) References Cited

U.S. PATENT DOCUMENTS

| | | |
|---|---|---|
| 7,457,905 B2 | 11/2008 | Gehman |
| 7,506,089 B2 | 3/2009 | Cho et al. |
| 8,286,014 B2 | 10/2012 | Han et al. |
| 8,510,580 B2 * | 8/2013 | Han et al. ................. 713/320 |
| 2002/0144045 A1 | 10/2002 | Edara et al. |
| 2005/0177664 A1 | 8/2005 | Cho et al. |
| 2005/0289369 A1 | 12/2005 | Chung |
| 2005/0289374 A1 | 12/2005 | Kim |
| 2007/0067549 A1 | 3/2007 | Gehman |
| 2008/0082840 A1 | 4/2008 | Kendall |
| 2008/0147858 A1 | 6/2008 | Prakash |
| 2008/0235415 A1 | 9/2008 | Clark et al. |
| 2009/0235099 A1 | 9/2009 | Branover |

OTHER PUBLICATIONS

Sousek, et al., "PCI Express Core Integration with the OCP Bus," CAST Inc., 2006, 15 pages.

Mentor Graphics, "PCI Express to AMBA 3 AXI Bridge IP," Mentor Graphics, Jun. 2007, 2 pages.

U.S. Appl. No. 12/156,320, filed May 30, 2008, entitled "Providing a Peripheral Component Interconnect (PCI)-Compatible Transaction Level Protocol for a System on a Chip (SoC)," by Ken Shoemaker, et al.

U.S. Appl. No. 12/080,076, filed Mar. 31, 2008, entitled "Integrating Non-Peripheral Component Interconnect (PCI) Resources Into a Personal Computer System," by Arvind Mandhani, et al.

U.S. Patent and Trademark Office, Notice of Allowance mailed on Apr. 14, 2010 in U.S. Appl. No. 12/080,076.

Taiwanese Patent Office, Office Action mailed Jan. 24, 2013 in Taiwanese application No. 098 09549.

Everton Carara, et al., "Communication Models in Networks-on-Chip," 2007, pp. 57-60.

U.S. Patent and Trademark Office, Office Action dated May 11, 2010 in U.S. Appl. No. 12/156,320.

U.S. Patent and Trademark Office, Notice of Allowance mailed Jun. 10, 2011 in U.S. Appl. No. 12/947,307.

U.S. Patent and Trademark Office, Office Action mailed Feb. 11, 2011 with Reply filed May 11, 2011 in U.S. Appl. No. 12/947,307.

U.S. Patent and Trademark Office, Notice of Allowance mailed Apr. 21, 2011 in U.S. Appl. No. 12/841,889.

U.S. Patent and Trademark Office, Office Action mailed Dec. 27, 2010 with Reply filed Mar. 28, 2011 in U.S. Appl. No. 12/841,889.

* cited by examiner

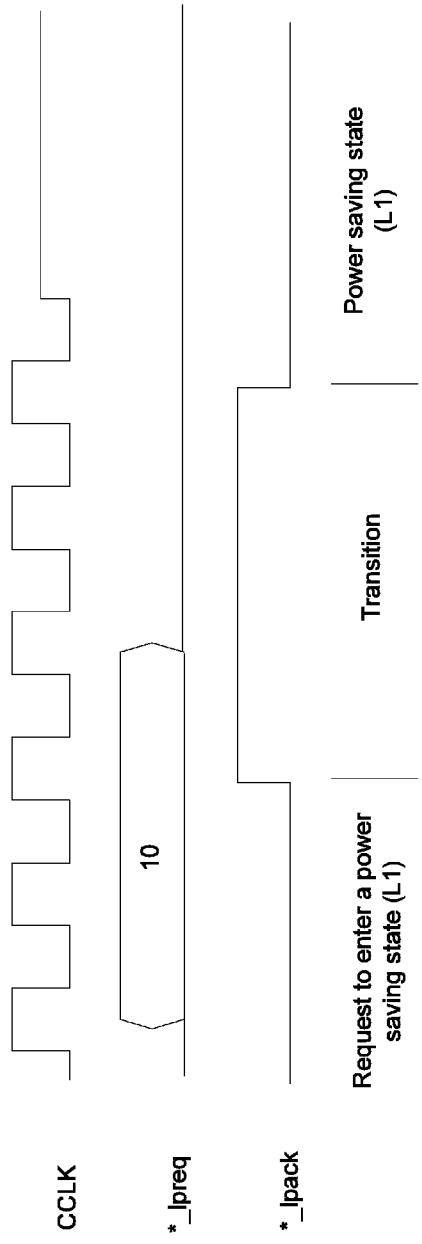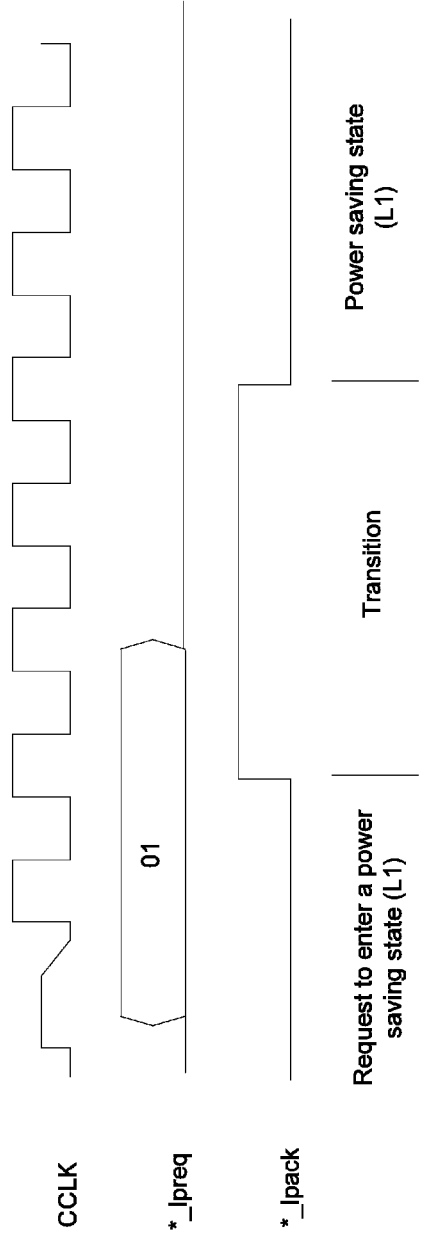

POWER MANAGEMENT FOR A SYSTEM ON A CHIP (SOC)

This application is a continuation of U.S. patent application Ser. No. 13/611,930, filed Sep. 12, 2012, now U.S. Pat. No. 8,510,580, issued on Aug. 13, 2013, which is a continuation of U.S. patent application Ser. No. 12/079,185, filed Mar. 25, 2008, which is now U.S. Pat. No. 8,286,014, issued on Oct. 9, 2012, the content of which is hereby incorporated by reference.

BACKGROUND

System on a chip (SoC) devices are becoming more prevalent. SoCs incorporate a large amount of processing functionality with (typically) heterogeneous devices on a single semiconductor device, avoiding the need for multiple components. As SoCs become more complicated over time, it becomes more important to have a common backbone for modular design and integration. At the same time, as the number of devices and subsystems grow, efficient and low overhead power management becomes more difficult as the number of subsystems expands. This is so, as the heterogeneous subsystems can have different frequency and voltage requirements. Further, each heterogeneous resource typically has its own power management (PM) protocol, generally developed on an ad hoc basis and lacking any standard signaling mechanisms.

BRIEF DESCRIPTION OF THE DRAWINGS

FIG. 3A is a timing diagram of handshake signals in accordance with one embodiment of the present invention.

FIG. 3B is a timing diagram of handshake signals in accordance with another embodiment of the present invention.

DETAILED DESCRIPTION

Figure 1:
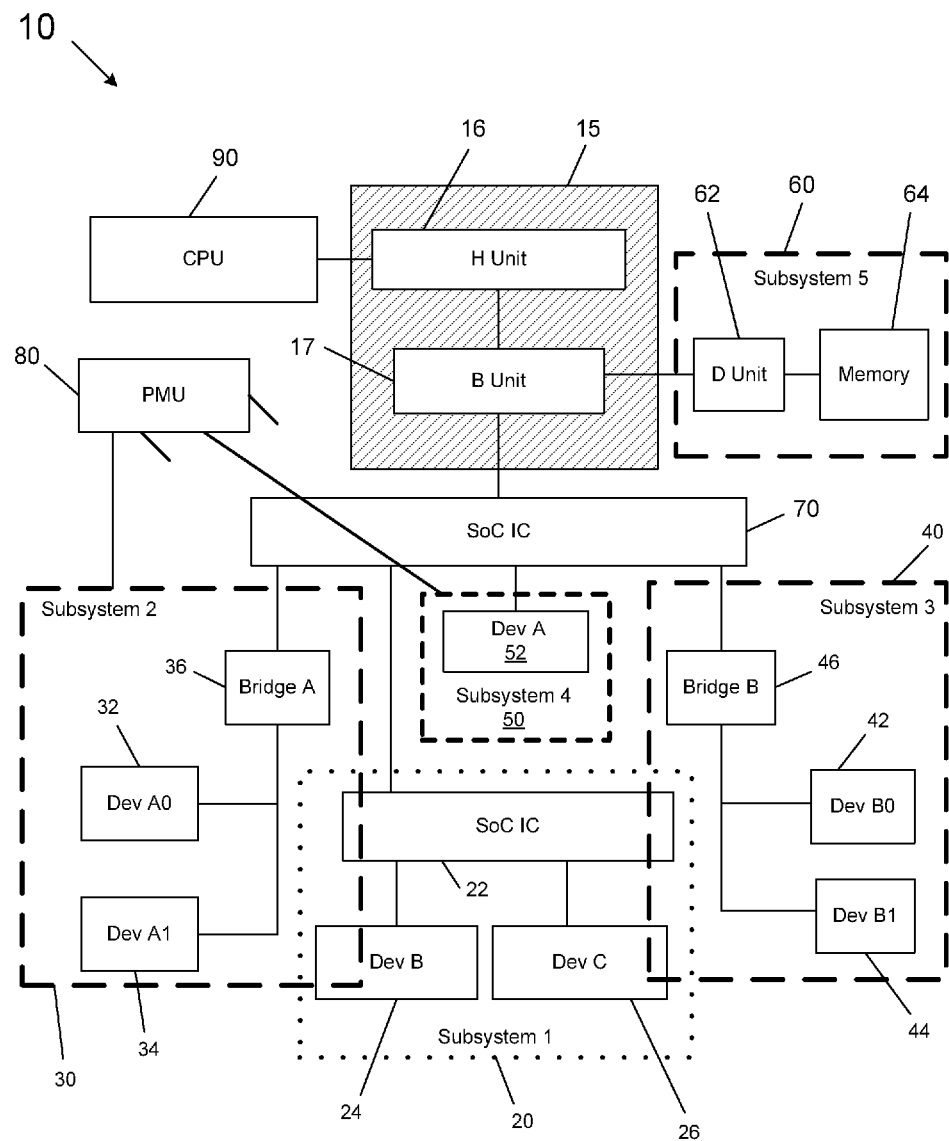
FIG. 1 is a block diagram of a SoC in accordance with one embodiment of the present invention.

Embodiments provide an efficient, low overhead handshaking scheme to set low power states for subsystems connected by a SoC interconnect. FIG. 1 shows a general block diagram of a SoC with exemplary subsystems. From a power management perspective, a subsystem can be a single device or a single function or group of devices that shares clock and power.

Referring now to FIG. 1, shown is a block diagram of a SoC 10 that includes a number of separate subsystems, all of which may be formed on a single semiconductor device, e.g., a single die. Specifically, subsystems 1 through 5, enumerated as subsystems 20-60 are shown. In addition, a main interface unit 15 is coupled to an upstream portion of an interconnect 70 to which the downstream subsystems are also coupled.

Still further, a power management unit (PMU) 80 can be coupled to interconnect 70, as well as certain ones of the individual subsystems. PMU 80 may include in one embodiment one or more clock controllers to generate one or more clock signals for providing to the different subsystems for operation. As will be described further below, in some implementations during low power operations for a given subsystem, PMU 80 may turn off a clock or gate a clock signal to a particular subsystem that is in the low power state. A processing unit 90 is coupled to main interface unit 15, which in one embodiment may be a single core or multiple cores in accordance with a given processor architecture, and which may be a low power processor, in some embodiments.

Main interface unit 15 includes a first unit 16 and a second unit 17, which may act as a memory arbiter and an interface to a subsystem 60, which in turn includes a first unit 62 and a memory 64 which, in one embodiment, may be a dynamic random access memory (DRAM). In turn, second unit 17 of main unit 15 is further coupled to an upstream fabric of interconnect 70.

In turn, a downstream fabric of interconnect 70 is coupled to a subsystem 20 including its own interconnect 22, along with several downstream devices 24 and 26. A subsystem 30 is coupled to the downstream fabric of interconnect 70 by way of a bridge 36 that is in turn coupled to devices 32 and 34. A subsystem 40 is coupled to the downstream fabric of interconnect 70 by way of a bridge 46 that is in turn coupled to devices 42 and 44. Still further, subsystem 50 has a device 52 directly coupled to the downstream fabric of interconnect 70. As shown in FIG. 1, PMU 80 may be directly coupled to subsystem 50. While shown with this particular implementation in the embodiment of FIG. 1, the scope of the present invention is not limited in this regard. Note that each of these subsystems may act as an individual unit with respect to PMU 80. That is, each subsystem can have its own clock and/or power domain depending on power states it can support.

In various embodiments, SoC 10 may thus act as the primary processing unit of a mobile internet device (MID). While such device can take different forms, in various implementations the MID may be an ultra portable computer, a portable communication device such as a cellular or other wireless-based telephone, or other such personal electronics device. Using embodiments of the present invention, fine-grained power management can be realized to control various subsystems of the device at a much finer level than an operating system (OS) such as a WINDOWS™ or a LINUX™ OS on which the system operates. For example, assume that one of the subsystems in FIG. 1 can operate with the functionality of a media player such as a motion picture experts group layer 3 (MP3) player. Rather than powering multiple subsystems and executing such functionality using an OS-based player, the OS may itself not execute, and various subsystems, including processing unit 90 may be in a low power state. More specifically, using an embodiment of the present invention, only the subsystem that has the MP3 functionality may operate in its normal device state. Of course other implementations are possible.

Figure 2:
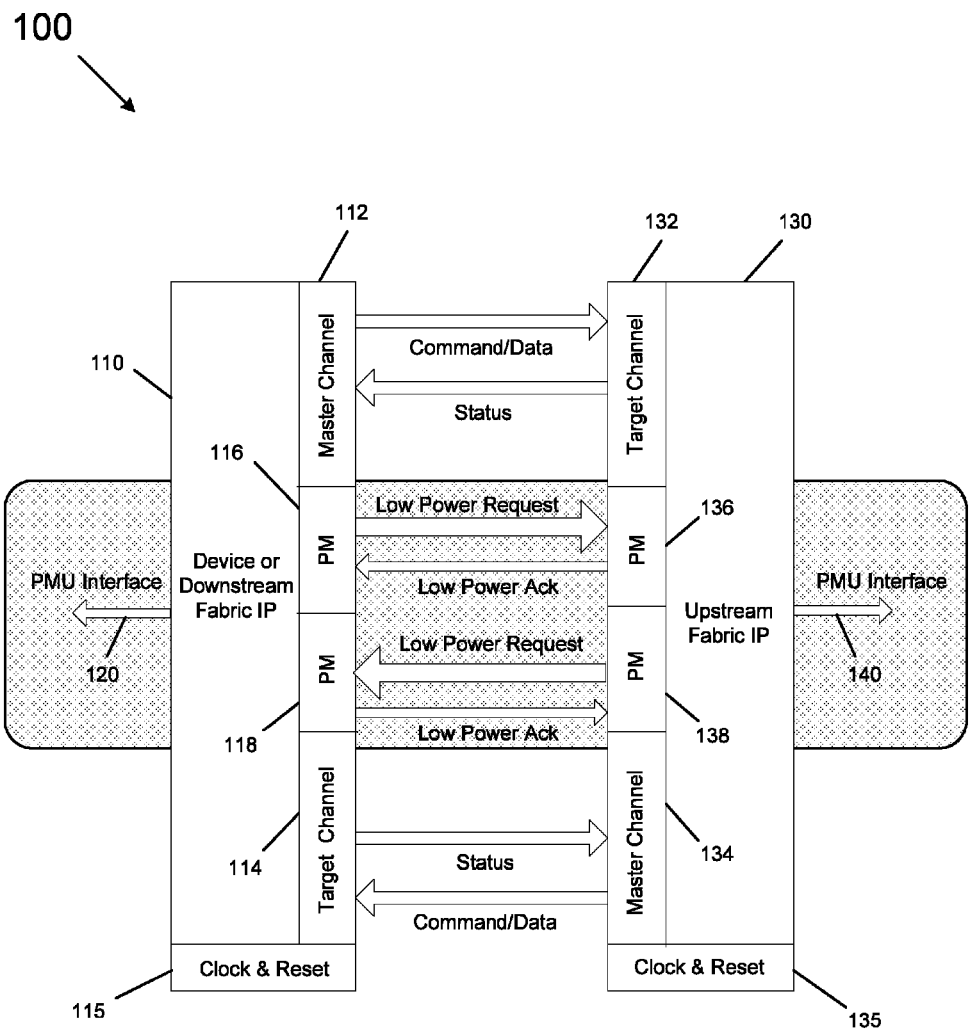
FIG. 2 is a block diagram of a SoC interconnect that implements link power management in accordance with one embodiment of the present invention.

Referring now to FIG. 2, shown is a block diagram of a SoC interconnect that implements link power management in accordance with an embodiment of the present invention. As shown in FIG. 2, interconnect 100 (which may correspond, e.g., in one embodiment to interconnect 70 of FIG. 1) includes a downstream fabric 110 and an upstream fabric 130. Downstream fabric 110 includes a master channel 112, a target channel 114, and a clock and reset channel 115. To provide link power management handshaking signals, downstream fabric 110 may include a plurality of power management channels 116 and 118 that can communicate low power requests and low power acknowledgement signals with a PMU (e.g., PMU 80 of FIG. 1) via a PMU interface 120. Thus by providing dedicated power management channels to enable handshaking signals in accordance with an embodiment of the present invention, a common power management protocol may be provided for a variety of heterogeneous resources of an SoC. Thus, there is no need for attempting to control in an ad hoc manner different resources of a SoC differently, e.g., using a differing amount of signals on differing amount of wires. Instead, using an embodiment of the present invention, a standard or common low power communication protocol may apply across a range of different heterogeneous resources of an SoC.

An upstream fabric 130 of interconnect 100 similarly includes a target channel 132, a master channel 134, clock and reset channel 135, and power management channels 136 and 138, which can communicate via a PMU interface 140. While shown with this particular implementation in the embodiment with a PMU of FIG. 2, the scope of the present invention is not limited in this regard.

Thus this interconnect 100 incorporates link power management handshaking signals along with a main data channel which may also include the message interface to/from the PMU. This message interface is not necessarily embedded in the main data channel but can be a sideband message channel.

Each subsystem can make a decision to go into low power state in one of two ways: a subsystem-initiated transition or a PMU-initiated transition.

In a subsystem-initiated transition, the subsystem determines whether it is in a condition to enter one of the available low power states. Table 1 sets forth available low power states available in accordance with one embodiment of the present invention.

TABLE 1

| Device (in subsystem) States | Legal Link States (based on Link PM) | |
|---|---|---|
| D0 | Active State | L0 |
| D0i0 | Active state or internal clock gating | <L1 |
| D0i1 | Suspended (no clock) | <L2 |
| D0i2 | Suspended or power off | <L3 |
| D0i3 | Power off | L3 |
| D1 | Suspended | <L2 |
| D2 | Suspended | <L2 |
| D3 | Power off | L3 |
| D3a0 | Active state | L0 |

Table 1 thus shows that multiple device states are available, with each device state corresponding to a given power level for a subsystem of the SoC. Table 1 also provides a brief definition of the given state, and a corresponding link state of a link coupled to the subsystem can be in while supporting a given device state. In one particular implementation, these device states may generally track those of a power management system such as Advanced Configuration and Power Interface (ACPI) in accordance with ACPI version 2.0 (published July 2000), for example. However, in addition to device states such as D0, D1, D2 and D3, embodiments may further provide for intermediate power states between given device states. Thus as shown in Table 1 device states D0$i$x, (x being 0-3) are available. Such intermediate device states may provide an appearance of a first device state to higher level software such as an OS, while the device itself is actually in a different power state. Specifically, in all of these intermediate states D0$i$x, the state of the device may appear to the OS to be in an active state (i.e., D0). However, some amount of low power operation is actually occurring in the device, namely one of intermediate states i0-i3. In this way, finer granularity of power management may be accommodated without reference to an OS. Similarly, intermediate power state D3a0 may appear to the OS that the device is off, however the device actually remains in an active state, namely a0, which corresponds to the D0 state. Note that in Table 1, for each of these device states, a corresponding link state may also be maintained.

For a subsystem-initiated request, a subsystem determines it is in condition to enter a low power state, and starts the process of transition by initiating link power management handshaking on the SoC interconnect. FIG. 3A shows one embodiment of signaling for such handshaking. As shown in FIG. 3A, a request to enter into a low power state, i.e., a LPREQ signal may be activated by a given subsystem. For example, assume a first subsystem desires to enter into a device low power state. Accordingly, the subsystem will send this low power request signal, to which the PMU may send a reply acknowledgement, namely LPACK signal. As shown in FIG. 3A, no other communications between subsystem and power management unit occur for the transition to take place and the link to enter to the power saving state. Instead, a transition occurs and the link transitions to the L1 power state (in the example of FIG. 3A).

The subsystem then optionally can report to the PMU its new power state through the message interface. The PMU will use state information to determine the next power state of other subsystems in the SoC. However, this transition does not necessarily involve the OS, and much finer grain power management can be provided than OS-driven PM.

Figure 4A:
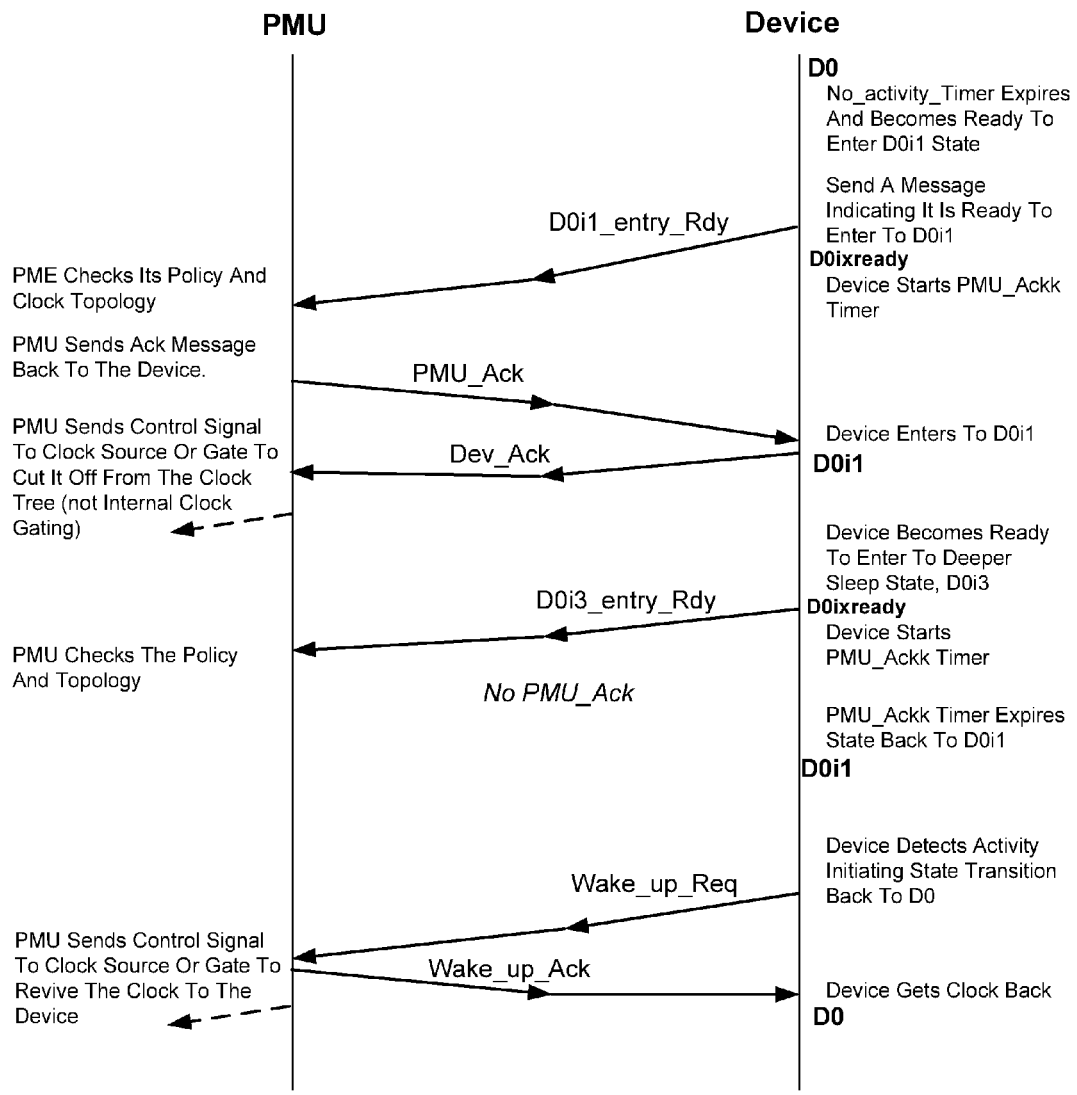
FIG. 4A is a flow diagram of a sequence of communications between an initiating device and a power management unit in accordance with one embodiment of the present invention.

The sequence of communications between initiating device and PMU is shown in FIG. 4A. Specifically, as shown in FIG. 4A, the device is in an active state D0 and a timeout timer, e.g., No_activity_Timer, expires and the device becomes ready to enter D0$i$1 state, sending the PMU a message indicating it is ready to enter D0$i$1. Accordingly the device sends the D0$i$1_entry_RDY signal to the PMU. In turn, the PMU checks its policy and clock topology and sends an acknowledgement message back to the device, namely the PMU_Ack signal, which causes the device to enter the D0$i$1 state and send an acknowledgement, Dev_Ack. Thus, the device enters D0$i$1 and later becomes ready to enter a deeper sleep state, e.g., D0$i$3. Thus the device sends the D0$i$3_Rdy signal, which causes the PMU to check its policy and topology. The device also starts an acknowledgement timer, PMU_Ackk timer. Note that there is no PMU acknowledgement signal shown in FIG. 4A. As such, the PMU_Ackk timer expires, and the state of the device remains in the D0$i$1 state. Then the device detects activity initiating a state transition back to D0, the device sends a Wake_up_Req signal, which causes the PMU to send a control signal to the clock source or gate to revive the clock to the device and send the Wake_up_Ack signal to the device, which enables the device to get its clock back. Note that for transitioning from a device D0 state to a device D0$i$0 state, no PMU communication need occur, as this transition remains with a link inactive state or internal clock gating of the device.

Figure 4B:
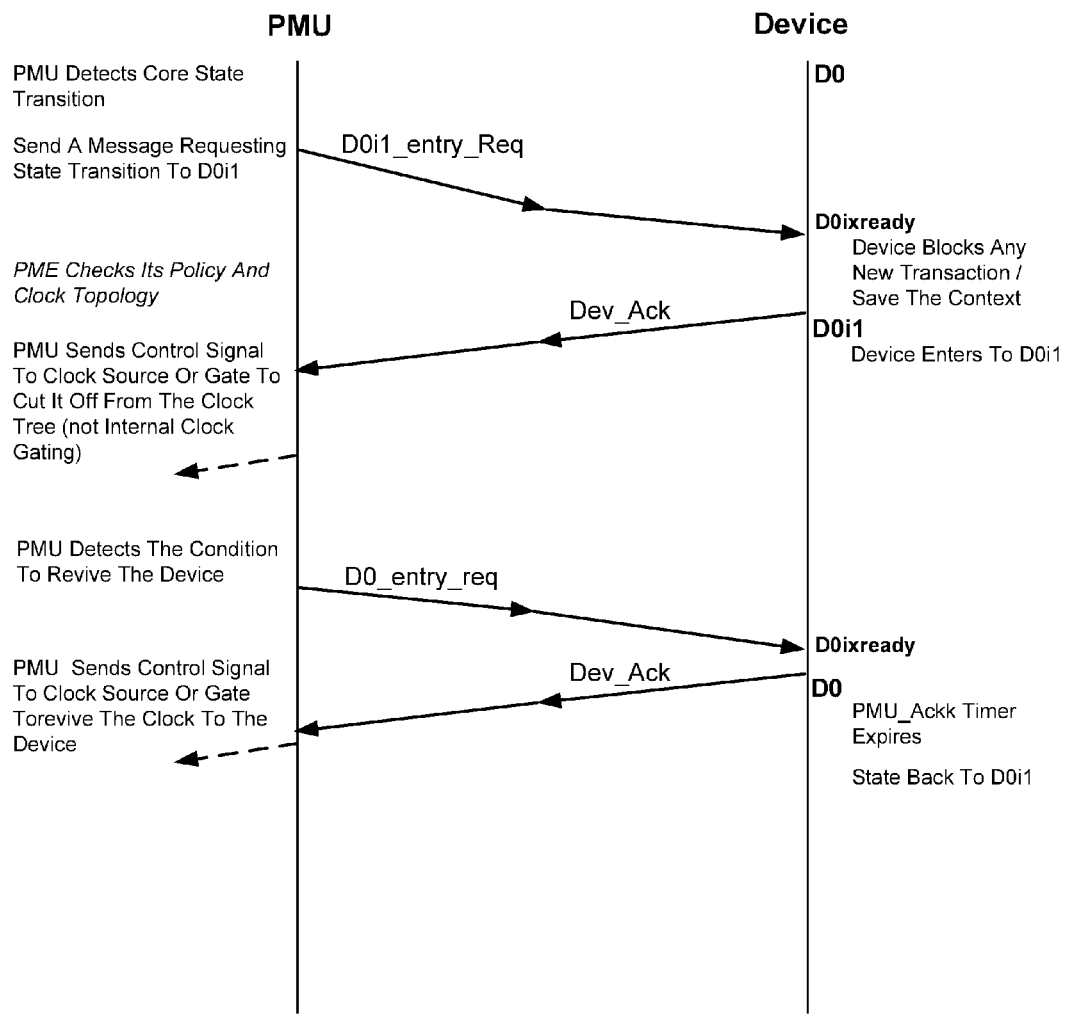
FIG. 4B is a flow diagram of a sequence of communications between a device and a power management unit in accordance with another embodiment of the present invention.

In a PMU-initiated transaction, the PMU determines whether it needs to put a certain subsystem into one of the low power states. In this case, the PMU initiates PM message communication through the message interface (as shown in FIG. 4B) which results in the link level PM protocol on the SoC interconnect, as shown in FIG. 3B. Specifically, as shown in FIG. 4B, when the PMU detects a core state transition, it sends a message requesting a state transition to D0$i$1 and checks its policy and clock topology. Accordingly, the PMU sends a D0o1_entry_Req signal to the subsequent control also referred to as a device.

Referring still to FIG. 4B, the device readies for entry into the low power state by blocking any new transactions and saving its context. The device then sends the Dev_Ack signal to the PMU, which causes the PMU to send a control signal to the clock source or a gate signal to cut the device off from the clock tree.

At a later time, the PMU detects a condition to revive the device. Accordingly, the PMU sends a D0_entry_req signal to the device, which causes the device to become ready to transition states and enter the D0 state. The device also sends the Dev_Ack signal, which causes the PMU to send a control signal to revive the clock source. In other embodiments, the PMU can send the control signal to revive the clock for the device prior to receipt of the acknowledgement signal. Note that when Dev_Ack_Timer in the PMU expires, the PMU may generate an event to the core in an implementation specific way (this is an erroneous condition).

Embodiments provide an efficient means to implement more aggressive power management without software intervention. The granularity of power management can be much finer than conventional PM. Unlike other link-based power management, embodiments do not require multiple packet transactions to finish a transition to a low power state or exit from the low power state. Embodiments also have much less, almost nil, overhead in real implementation and hence can be applied to an implementation with minimal power consumption at the link and physical layer. Embodiments further include a mechanism that allows coordination with the PMU through a message interface between PMU and the initiator of this link power management. The other link partner need not be explicitly coordinated by PMU and hence there is no need for the link partner to have the message interface to the PMU. Embodiments can also report the status of a downstream subsystem to an upstream subsystem without software intervention and hence the upstream subsystem can autonomously determine to initiate communication with the PMU to enter a low power state. With this, along with PMU and the messaging interface between the subsystem and PMU, the system can support behavioral intermediate states to save power beyond standard power saving states such as ACPI states.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a plurality of resources formed on a single semiconductor device and each of an independent domain;
   an interconnect of the single semiconductor device to communicate with the plurality of resources; and
   a power management unit (PMU) of the single semiconductor device to provide clock signals for each of the plurality of resources, wherein the PMU is to implement a common power management protocol across the plurality of resources independent of an operating system (OS) of the system, the common power management protocol to enable an intermediate power saving state between consecutive device power states of an OS-driven power management system, wherein a first resource and a second resource are controllable to be maintained in different power states via the PMU.

2. The system of claim 1, wherein the PMU is to turn off a clock signal for the first resource when the first resource is in a power saving state.

3. The system of claim 2, wherein the PMU is to maintain a clock signal for the second resource when the first resource is in the power saving state.

4. The system of claim 1, wherein the PMU is to send a first link handshake signal between the first resource and the PMU on a sideband channel coupled between the first resource and the PMU, the first link handshake signal to request entry into a power saving state for the first resource, and receive a second link handshake signal from the first resource to acknowledge the request, and place the first resource into the power saving state without further signaling between the PMU and the first resource.

5. The system of claim 4, wherein the first and second link handshake signals are initiated without involvement of the OS.

6. The system of claim 4, wherein the first resource is to initiate the first link handshake signal and the PMU is to send a control signal to a clock controller to cause the clock controller to stop clocking the first resource so that it enters the power saving state.

7. The system of claim 6, wherein the PMU is to send a second control signal to cause the clock controller to begin clocking the first resource after receipt of a second link handshake signal from the first resource to request an exit from the power saving state.

8. The system of claim 1, wherein the interconnect includes a plurality of power management channels, a target channel and a master channel.

9. The system of claim 1, wherein the system comprises a mobile internet device, and one of the resources comprises a media player, wherein the PMU is to enable the media player to execute while at least some of the other resources are in a low power state.

10. The system of claim 9, wherein the mobile internet device comprises a cellular telephone.

11. A system-on-chip (SoC) comprising:
    a plurality of resources formed on a single semiconductor die, at least some of the plurality of resources of an independent power domain;
    an interconnect of the single semiconductor die to communicate with the plurality of resources; and
    a power management unit (PMU) of the single semiconductor die to provide clock signals for at least some of the plurality of resources, wherein the PMU is to implement a power management protocol across the plurality of resources independent of an operating system (OS), the power management protocol to enable an intermediate power saving state between consecutive device power states of an OS-driven power management system.

12. The SoC of claim 11, wherein the PMU is to send a first link handshake signal to a first resource coupled to the PMU, the first link handshake signal to request entry into a power saving state for the first resource, and receive a second link handshake signal from the first resource to acknowledge the request, wherein the first resource is to enter into the intermediate power saving state without further signaling between the PMU and the first resource.

13. The SoC of claim 11, wherein a first resource is to initiate a first link handshake signal and the PMU is to send a control signal to a clock controller to cause the clock controller to stop clocking the first resource so that it enters a low power state and the PMU is to send a second control signal to cause the clock controller to begin clocking the first resource after receipt of a second link handshake signal from the first resource to request an exit from the low power state.

14. The SoC of claim 11, wherein one of the resources comprises a media player, wherein the PMU is to enable the media player to execute while the other resources and the OS are not operating.

15. The SoC of claim 14, wherein the interconnect comprises an upstream fabric and a downstream fabric.

16. The SoC of claim 11, wherein a first resource is to appear to the OS to be in a first device state when the first resource is in a second device state.

17. The SoC of claim 11, wherein a first resource is to appear to the OS as being off when the first resource is in an active state.

18. A method comprising:
sending a first link handshake signal between a first subsystem of a first power domain and a power management unit (PMU) of a system on a chip (SoC) on a sideband channel coupled between the first subsystem and the PMU, the SoC further including a second subsystem of a second power domain controllable to be in a different power state than the first subsystem, the first link handshake signal to request entry into a power saving state for the first subsystem, the power saving state not corresponding to a device power state of an operating system (OS)-driven power management system;
sending a second link handshake signal between the first subsystem and the PMU to acknowledge the request; and
entering into the power saving state for the first subsystem in response to the second link handshake signal without further signaling between the PMU and the first subsystem.

19. The method of claim 18, further comprising sending the first and second link handshake signals through a SoC interconnect, wherein the SoC interconnect further includes a data channel, the first and second link handshake signals initiated without OS involvement.

20. The method of claim 19, further comprising sending a control signal from the PMU to a clock controller to cause the clock controller to stop clocking the first subsystem, after receipt of the second link handshake signal by the PMU from the first subsystem.

* * * * *